United States Patent [19]

Van Rosmalen

[11] Patent Number: 4,536,864
[45] Date of Patent: Aug. 20, 1985

[54] APPARATUS FOR READING AN OPTICALLY CODED DISC-SHAPED RECORD CARRIER

[75] Inventor: Gerard E. Van Rosmalen, Eindhoven, Netherlands

[73] Assignee: U.S. Philips Corporation, New York, N.Y.

[21] Appl. No.: 489,284

[22] Filed: Apr. 28, 1983

[30] Foreign Application Priority Data

Mar. 9, 1983 [NL] Netherlands .......................... 8300844

[51] Int. Cl.³ .............................................. G11B 7/00
[52] U.S. Cl. ........................................ 369/44; 369/60; 369/111
[58] Field of Search ....................... 369/44, 30, 32, 59, 369/60, 111, 84, 85; 358/342; 360/8, 9.1, 15; 365/215

[56] References Cited

U.S. PATENT DOCUMENTS 3,855,424 12/1974 Tharmaratnam et al. .............. 360/8
4,355,338 10/1982 Yamamoto et al. .................... 360/15
4,403,259 9/1983 Masaki .................................. 358/342
4,410,917 10/1983 Newdoll et al. ........................ 369/84
4,463,389 7/1984 Golding .................................. 360/8

OTHER PUBLICATIONS

Lee, "Time Compression and Expansion of Speech by the Sampling Method", Journal of the Audio Eng. Society, Nov. 1972, vol. 20, No. 9, pp. 738–742.
"Optical Video Disc May Meet Future Needs for High Volume Data Storage", Computer Design (USA), vol. 18, No. 2, Feb. 1979, pp. 39–40.

Primary Examiner—Donald McElheny, Jr.
Attorney, Agent, or Firm—Robert T. Mayer; Algy Tamoshunas

[57] ABSTRACT

The invention relates to an apparatus for reading a disc-shaped record carrier with a spiral information track in which an optically readable digitally coded information signal is recorded with a spatial bit frequency which is independent of the radius of the track turn. The scanning speed of the information track is selected to be a factor n higher than the scanning speed normally employed of the reproduction for the recorded information. By means of a memory device, information blocks being read and comprising a fixed number of data bits are time-expanded to restore the customary time relationship. A control unit determines the read-in cycles of the memory device for the storage of the information blocks being read and, via the radial positioning system for the read spot, it determines the scanning pattern of the record carrier so that the ultimately recorded information blocks are reproduced in the same sequence and at the desired rate.

7 Claims, 10 Drawing Figures

APPARATUS FOR READING AN OPTICALLY CODED DISC-SHAPED RECORD CARRIER

BACKGROUND OF THE INVENTION

The invention relates to an apparatus for reading a disc-shaped record carrier with a spiral information track provided with optically readable digitally coded information, said digital information being recorded in the information track as a stream of data bits of constant spatial bit-frequency independently of the diameter of the track turn and comprising a sequence of detectable information blocks with a fixed number of data bit, such an apparatus is provided with a radiation source for emitting a read beam, an optical system for projecting said read beam as a read spot on the record carrier, a detection system for detecting the information contained in the read beam after cooperation with the record carrier, a conversion arrangement for converting said information into an electric information signal, a positioning system for controlling the radial position of the read spot on the record carrier, and a servo system for controlling the scanning speed of the record carrier in order to obtain an electric information signal of a desired bit frequency which is constant independently of the radial scanning position on the record carrier.

Currently, recording/reproducing systems employing optically readable disc-shaped record carriers are in the focus of interest. An example of systems of this type is the so-called Compact Disc Digital Audio System, as inter alia described in Philips Technical Review, Vol. 40, 1982, no. 6, which is incorporated by reference in this application.

This system employs a disc-shaped record carrier in which digitally coded audio information is recorded in a spiral information track in the form of an optically readable relief structure. Thus, the information track contains a stream of data bits representing the audio signal. These data bits are recorded in the information track with a constant spatial frequency, i.e. each data bit occupies a constant unit of length in the information track regardless of the radial position on the record carrier. This means that the number of data bits per track turn varies as a function of the radius of the track turn, i.e. the number of data bits per track turn increases as the radius increases.

When reading such a record carrier the information track is scanned by a read spot formed on the record carrier by a read beam, so that the data bits of the digital audio signal are read serially. The scanning speed, i.e. the relative speed between the record carrier and the read spot in the longitudinal direction of the information track is then controlled in such a way that the digitally coded audio signal is read with a constant bit frequency. For this purpose the speed of the record carrier is generally controlled depending on the bit frequency of the digital signal being read. When the spiral information track is scanned from the inside towards the outside, the rotational speed of the record carrier therefore decreases gradually.

For an optimum read-out of the record carrier various servo-systems which cooperate with the optical read system are required. For example, the read apparatus comprising a positioning system for controlling the radial position of the read spot on the record carrier so as to ensure that the read spot remains centred on the information track despite possible eccentricities of this information track. Furthermore, the read apparatus comprises a focusing system which ensures that the read beam remains correctly in focus on the information surface of the record carrier. Since the width of the information track is very small and the information density very high, stringent requirements are imposed on these servo systems.

Primarily, the servo systems must have a high gain and a large bandwidth in order to achieve an accurate positioning and focusing of the read spot. Such servo-systems, however, are very sensitive to spurious signals as a result of imperfections in the record carrier such as inclusions in the recording material and flaws in or contaminations of the record carrier surface. As a result of such imperfections, the information read-out may become disturbed for some time. However, the control signals applied to the servo-systems are also disturbed. As a result of the high gain and large bandwidth of these servo-systems, such a disturbance may result in one or both servo-systems overstepping their control ranges, so that in fact they are temporarily inoperative. Since a correct read-out is not possible until both servo-systems have locked-in again, this means that in effect the read-process may be disturbed for a substantially longer time than would be anticipated on account of the imperfection in the record carrier. An additional undesired factor is that the temporary failure of the radial positioning system may cause the read spot to be shifted over one or more track distances before this positioning system is again capable of keeping the read spot centred on the information track, which results in an extremely annoying audible transient in the reproduction of the recorded audio signal.

This susceptibility of the servo-systems to imperfections in the record carrier can be reduced by reducing the gain and bandwidth of the servo-systems. In practice a compromise is therefore made between these two conflicting requirements imposed on the gain and bandwidth of the two servo-systems. This compromise leads to an increased susceptibility of the apparatus to external shocks and vibrations. This is not objectionable if the apparatus is used in a stable environment, for example a living room. However, if the apparatus is to be used in a less stable environment, for example a car, this will pose a serious problem.

SUMMARY OF THE INVENTION

It is the object of the invention to provide an apparatus of the type mentioned in the opening paragraph which enables a correct read-out of the record carrier also under extreme conditions, i.e. having a high resistance to external shocks and vibrations, without a deterioration of the sensitivity to imperfections in the record carrier.

To this end, the invention is characterized in that the servo-system for controlling the scanning speed is adapted to control the scanning speed so as to obtain an electric information signal of a constant first bit-frequency, which is a factor n higher than the ultimately desired bit frequency. The conversion arrangement comprises a memory device for the storage, with the first bit frequency, of the data bits of an information block being read and for subsequently supplying said data bits with the desired bit frequency. The apparatus further comprises a control unit which is coupled to the positioning system for effecting a jump-back of the scanning spot by one track pitch at instants which are determined by said control unit, and which is also coupled to the memory device, for determining the read-in periods in this memory. The control unit is constructed so that as a result of the scanning pattern of the information track and the read-in periods of the memory device determined by said control unit, consecutive information blocks are read into the memory device in accordance with a cycle which is determined by the control unit and are subsequently supplied by said memory device as a continuous sequence of information blocks. In accordance with the invention the record carrier is scanned with a scanning speed which is a factor n higher than the customary scanning speed, i.e. the speed of the record carrier is a factor n higher. The invention is based on the insight that owing to this higher scanning speed the control signals for the servo-systems are disturbed for a shorter time by imperfections in the record carrier. This allows the gain and the bandwidth of said servo-systems to be increased, because the likelihood that the operation of these servo-systems is impaired by such a disturbance depends on the length of the disturbance. By increasing the gain and bandwidth of the servo-systems, the apparatus becomes more immune to external shocks and vibrations thereby allowing the use of the apparatus under extreme conditions.

For the serial reproduction of the recorded information with the desired bit frequency, the invention employs a memory device which is capable of storing the data bits of an information block being read with the first bit frequency which corresponds to the higher scanning speed and of transferring these data bits with the desired lower bit frequency to the further signal processing circuitry. Thus, said memory device restores the information block to the desired length of time. Furthermore, care must be taken that the consecutive information blocks on the record carrier are ultimately transferred to the signal processing circuitry in this very sequence. This is achieved by generating a track jump of the read spot at regular intervals via the radial positioning system, so that not later than the instant at which the time expansion of an information block read has terminated the read-out of the next information block recorded can commence.

It is to be noted that U.S. Pat. No. 4,075,665 describes a recording and reproducing system based on the use of an optically coded disc-shaped information carrier for the reproduction of video information. This record carrier is rotated with a constant speed required for the reproduction of the video signal. For the reproduction of an audio signal which is recorded on the record carrier as a plurality of samples, consecutive samples of this audio signal are read, after which time expansion is applied in order to recover the desired audio signal.

The required capacity of the memory device firstly depends on the number of information blocks recorded in the outer track circumference of the information track and the number of data bits per information block. Moreover, this number of information blocks in the outer track turn imposes limitations on the choice of the speed, i.e. the factor n. An embodiment of the apparatus in accordance with the invention is therefore characterized in that for a record carrier in which the number of information blocks recorded in the outer turn of the information track is M the factor n is at least greater than M/N30 1, N being an integer, and the memory device has a capacity which is at least sufficient for the storage of NP data bits, P being the number of data bits of one information block. If a read system is selected in which N information blocks, i.e. NP data bits, are read and stored in the memory device as a single block, the capacity of the memory device must be at least 2NP in order to obtain a continuous reproduction of the recorded information. The capacity n which is ultimately required then also depends on the ratio between the diameter of the outer and the inner turn of the information track.

In order to minimize the required storage capacity of the memory device, a preferred embodiment of the apparatus in accordance with the invention is characterized in that for N greater than one, the memory device comprises N memories each having a capacity which is at least sufficient for storing P data bits, and the control unit is laid out to individually determine the read-in cycles of each of these memories.

The read-in cycles of the memory device can be controlled in various ways. A further embodiment of the apparatus in accordance with the invention, in which each of the information blocks recorded on the record carrier comprises an individual identification code, is characterized in that the control unit comprises an identification-code detector for detecting the identification code of an applied information block and the read-in cycle of the memory device and the scanning pattern of the record carrier are determined by this control unit in conformity with the detected identification codes.

A further embodiment, in which each of the information blocks recorded on the record carrier comprises a detectable beginning and/or end code, is characterized in that the control unit comprises a detector for detecting said beginning and/or end code. The apparatus is provided with a tacho-system for defining a revolution period of the record carrier at each scanning instant, and the control unit determines the read-in cycle of the memory device and the scanning pattern of the record carrier in conformity with the detected beginning and/or end codes of the information blocks and the revolution period defined by the tacho-system. The tacho-system may then solely comprise a tacho-generator which is coupled to the record carrier drive. Another possibility is to derive a tacho-signal from the information recorded on the disc. However, since the information content varies per track turn as a function of the diameter of the track turn, this requires a measuring cycle in which the number of tacho-pulses for a specific track turn is determined.

DESCRIPTION OF THE DRAWINGS

The invention will now be described in more detail, by way of example, with reference to the drawing, in which:

FIG. 5 schematically shows a first embodiment of the conversion arrangemend used in the apparatus in accordance with the invention, while

DESCRIPTION OF THE PREFERRED EMBODIMENTS

Figure 1:
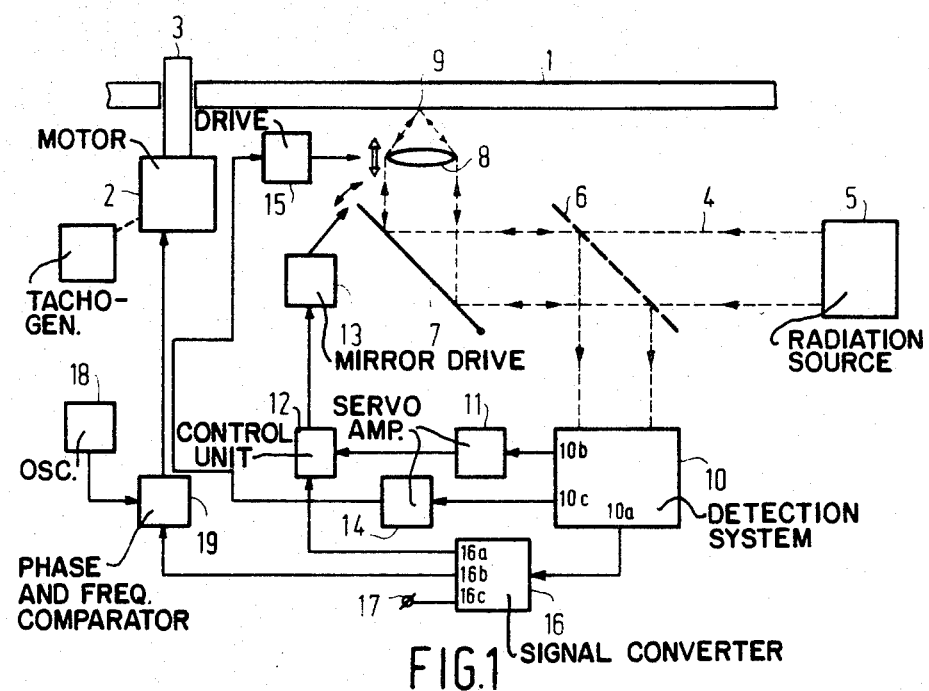
FIG. 1 is a block diagram of a read apparatus for a disc-shaped record carrier with an optically detectable information structure.

FIG. 1 by way of illustration schematically shows a read apparatus for an optically coded disc-shaped record carrier 1. This record carrier is rotated by a motor 2 via spindle 3 which projects through a central aperture in the record carrier 1.

The information recorded on the lower surface of the record carrier 1, for example in the form of a reflecting or relief structure, is read by means of a radiation beam 4. This radiation beam 4 is emitted by a radiation source 5 and via a semi-transparent mirror 6, a pivotal mirror 7 and a lens 8 it is projected onto the information surface of the record carrier 1 as a read spot 9. Subsequently, the radiation beam which is reflected by the record carrier 1 is imaged on a detection system 10 via the lens 8, the pivotal mirror 7 and the semi-transparent mirror 6.

This detection system 10 firstly detects the information present in the radiation beam 4 and transfers this information to an output 10a. Moreover, this detection system 10 produces a radial error signal on its output 10b, which signal represents a possible deviation in the radial position of the read spot 9 from the desired information track. This error signal is applied to positioning system comprising a servo-amplifier 11, a control circuit 12 and a drive unit 13, which controls the angular position of the pivotal mirror 7. This positioning system thus ensures that the read spot 9 remains positioned on the information track regardless of possible eccentricities of the information track on the record carrier. Moreover, the detection system 10 can produce an error signal for the focusing of the read spot 9 on the information surface of the record carrier 1 on its output 10c. Via a servo-amplifier 14 this error signal is applied to a drive means by means of which the lens 8 can be moved in a vertical direction. This focusing system ensures that the read spot remains positioned correctly on the information surface regardless of any out-of-flatness of the record carrier. Detection systems 10, positioning systems and focusing systems are known in a multitude of variants from the literature. As the construction of these systems is irrelevant to the present invention reference is made, by way of illustration, to U.S. Pat. Nos. Re. 29,963, 3,876,841, 3,876,872, 3,992,574, 4,057,833 and 4,051,527.

The signal conversion arrangement 16 receives the information signal being read from the output 10a of the detection system 10 and after processing supplies the relevant information signal to an output terminal 17 via the output 16c for further processing. The operation carried out in said conversion arrangement in accordance with the invention will be described in more detail further on. On its output 16b this conversion arrangement 16 also supplies a pulse train whose repetition frequency corresponds to the bit frequency of the read-out digital information signal on the output 10a of the detection system 10. This pulse train is applied to a phase and frequency comparator 19, which also receives a pulse train from a crystal-controlled oscillator 18. Depending on the measured frequency and/or phase difference the phase and frequency comparator 19 supplies a control signal to the motor 2 in order to achieve that the information signal is read with a constant bit frequency. Finally, the conversion arrangement 16 produces a control signal for the radial positioning system on its output 16a, which control signal is applied to the control circuit 12. The function of this control circuit 12 in relation to the control signal supplied by the conversion arrangement will also be described later.

Figure 2:
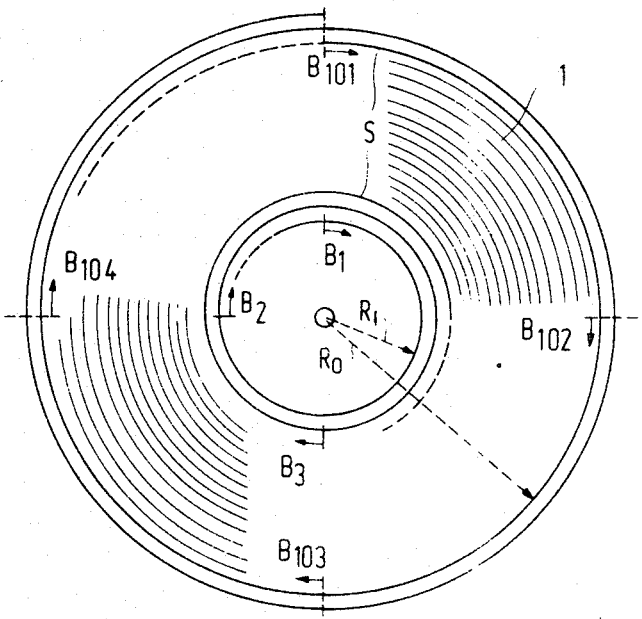
FIG. 2 schematically shows how the information blocks are arranged in the information track of such a record carrier.
Figure 3:
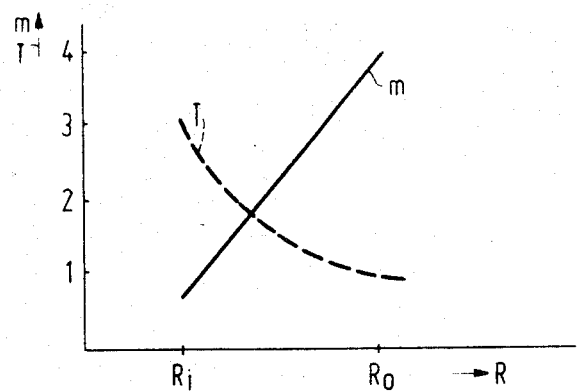
FIG. 3 shows the number of information blocks per track circumference and the corresponding record-carrier speed as a function of the scanning radius.

By way of illustration FIG. 2 shows a disc-shaped record carrier 1 as used in the so-called Compact Disc Digital Audio System. This record carrier contains a spiral information track S, which begins at a radius Ri and ends at a radius Ro. A digitally coded audio signal is recorded in this information track S, namely in an optically detectable relief structure which can be read by means of a radiation beam. This audio information is recorded in such a way that the information density on the disc is the same regardless of the radial position on the disc, i.e. the spatial bit frequency of the data bits is the same anywhere on the disc. In the Figure this is illustrated by means of information blocks B with a constant number of data bits of the information signal. It is assumed that such an information block B in the information track has a length L equal to $\frac{1}{2}\pi$ Ro, Ro being the outer radius, so that it is evident that the track circumference with the outer radius Ro contains 4 information blocks (B101, B102, B103, B104). However, the track circumference with the inner radius Ri contains only 4 Ri/Ro information blocks. Thus, the number of information blocks B per track circumference varies as a function of the radius R of the relevant track circumference. In FIG. 3 this number is plotted as a function of the radius, assuming that the outer radius (Ro) contains 4 information blocks.

During reading of this record carrier the bit frequency of the digital signal read is constantly maintained independent of the radial position of the read spot on the disc. This means that the tangential scanning speed of the information track is constant independently of the radius. This implies that the speed with which the record carrier is rotated varies as a function of the radius of the information track being read, i.e. the speed varies from a large value when the inner radius of the spiral information track is read to a smaller value when the outer radius of this information track is read. By way of illustration the variation of this speed T is also plotted in FIG. 3.

By constructing the oscillator 18 in FIG. 1 so as to supply a pulse train of the desired bit frequency fo, the speed of the record carrier 1 is continuously and automatically adjusted as the scanning radius changes so that the bit frequency of the read-out information signal is always equal to the desired value fo.

According to the invention the speed of the record carrier is selected to be a factor n times higher than customary for reading such a record carrier. This may simply be achieved by not adapting the speed control for the motor 2 to the customary bit frequency fo but to an n times higher bit frequency, i.e. the oscillator 18 now supplies a bit frequency n fo.

This increase of the speed has very advantageous consequences for the control systems, in particular the radial positioning system and the focusing system. Since possible imperfections of the record carrier, such as inclusions in the information layer and flaws or contaminations of the record-carrier surface, disturb the control signals for these servo-systems for a substantially shorter time owing to the higher speed, this allows the band-width of these servo-systems to be increased substantially. This means that these servo-systems are capable of maintaining the desired control to a high extent, despite possible external shocks or vibrations. Moreover, as a result of the higher scanning speed the frequency band-width of the read-out information signal is shifted towards a higher value, which means a reduced risk of crosstalk of this information signal to the control signals for the servo-systems, which control signals occupy a comparatively low frequency band. Thus, the step in accordance with the invention leads to a higher reliability of the read apparatus, in particular the resistance to external shocks and vibrations, so that such apparatus may also be used under extremely difficult conditions such as in cars.

During reproduction, the digital information, which is read with the higher speed, must be converted into a digital signal of a bit frequency equal to the desired bit frequency fo. This means that time expansion of the read-out digital information is required. Since this information has been recorded on the record carrier with a fixed spatial frequency, this requires a special organization of the read process, use being made of the structure of the recorded digital information.

Figure 4:
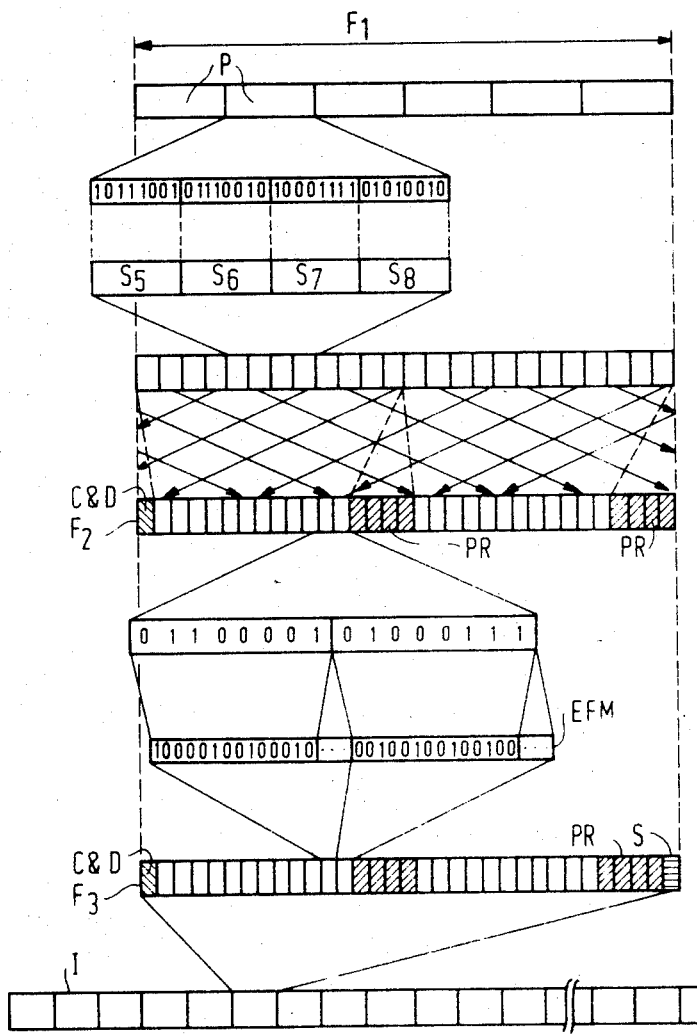
FIG. 4 schematically represents the signal format as used in the Compact Disc Digital Audio System.

The process will be described in more detail hereinafter for digital audio information as recorded on a record carrier which forms part of the Compact Disc Digital Audio System, which is schematically shown in FIG. 4. In this system the information flow is organized in so-called frames $F_1$. One frame comprises 6 periods P, each comprised of 32 audio bits, namely $2 \times 16$ bits for the two stereo channels. These periods P are divided into symbols of 8 data bits, so that one frame $F_1$ contains 24 audio symbols. To these 24 audio symbols of a frame $F_1$ 8 parity symbols PR and one so-called subcode symbol C & D are added, resulting in a frame $F_2$ comprising 33 data symbols. Subsequently, the bit stream is modulated in accordance with the so-called EFM (eight-to-fourteen modulation) code, each symbol of 8 data bits being converted into a symbol of 14 channel bits and 3 additional channel bits are added to each symbol for controlling the minimum and maximum distance between consecutive edges in the bit stream and minimising the so-called DSV (d.c. content of the bit stream). Moreover, a synchronisation word S of 27 channel bits is added. The final result is a frame $F_3$ comprising 588 channel bits.

Finally, 98 frames $F_3$ together constitute one information block I. The beginning of such an information block is characterized unambiguously in that the subcode symbol C & D of the first frame of this information block, i.e. the first symbol of this information block, is constituted by a bit sequence which does not fit within the applied EFM modulation. The beginning of an information block I can therefore be detected unambiguously. Furthermore, the subcode symbols C & D of the other 97 frames of the information block together yield inter alia, a time code which is specific to that information block, so that each information block has an individual identification code. In a first embodiment of the apparatus in accordance with the invention this is utilized for organising the read process.

Figure 5:
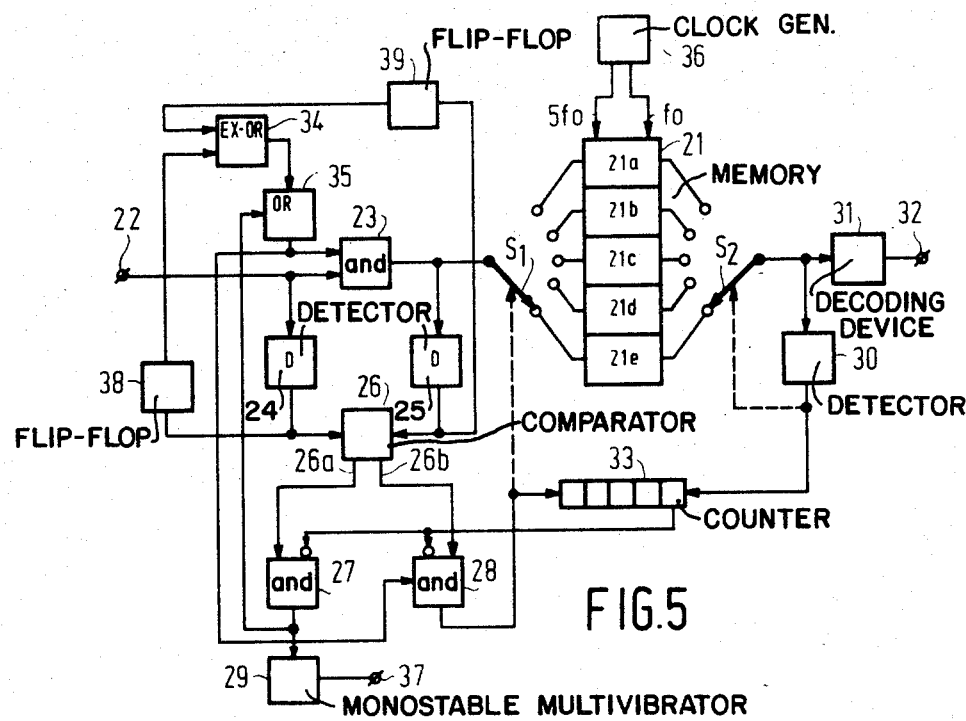

This embodiment of the apparatus in accordance with the invention is schematically shown in FIG. 5, which in fact shows the conversion arrangement 16 in FIG. 1. Said arrangement firstly comprises a memory device 21 comprising five memories 21a to 21e. Each of these memories has a storage capacity which is sufficient for storing the data bits of one information block I. These memories may for example comprise RAM's, consecutive data bits being written into consecutive storage locations via the addressing and being read out at a later instant. The inputs of the 5 memories 21a to 21e are connected to the contacts of a switch $S_1$, which determines which of the memories may be filled with an information block at a specific instant. The outputs of the memories are connected to the contacts of the switch $S_2$ which determines which of the memories is to be read out.

The read-in and read-out rhythm with which the data bits are read into and out of a memory is defined by two clock frequencies 5 fo and fo respectively, which are supplied by a generator 36. Since the read-in rhythm is a factor 5 higher than the read-out rhythm, this means that an information block I which is read into a memory is subjected to a time expansion by a factor 5. The generator 36 is synchronized by the bit frequency of the signal read, so that the clock frequency 5 fo is automatically equal to this bit frequency.

The master contact of the switch $S_1$ is connected to the output of an AND-gate 23, of which one input is connected to an input terminal 22, which receives the signal read from the record carrier, i.e. which is connected to the output 10a of the detection system 10 shown in FIG. 1. Both this input and the output of the AND-gate 23 are connected to a detector, 24 and 25 respectively, which detectors are adapted to detect the identification code of an applied information block I. The outputs of these two detectors are connected to a comparator 16 which compares the identification codes supplied by the two detectors 24 and 25 with each other. On its output 26a this comparator 26 delivers a binary signal which has a logic value "1" if and as long as consecutive identification codes applied by the detectors 24 and 25 are equal. On its output 26b this comparator 26 also produces a pulse at each instant of comparison in the case of equality of these identification codes. The output 26a is connected to an AND-gate 27 and the output 26b to an AND-gate 28. The output of the AND-gate 28 is coupled to the switch $S_1$ for controlling the position of the switch. Moreover, the output of this AND-gate 28 is connected to the input of a counter 33, whose count is incremented by one upon each pulse from the AND-gate 28. A second input of this counter 33 is connected to a detector circuit 30, which supplies one pulse when an information block I is read out from the memory device. For this purpose the detector 30 may be identical to the detectors 24 and 25, but it should supply a pulse only when an identification code is detected. However, as this detector should only detect the end of an information block it may for example also be constructed to supply a pulse upon detection of the last synchronisation word S of an information block. Each pulse from the detector 30 decrements the counter 32 by one. The count of the counter 33 thus indicates at any instant how many of the memories 21a to 21e are available for the storage of new information blocks I. As it is only of interest to know when all memories are already occupied by an information block I, corresponding to the count 5, this counter 33 may be very simple. In one version it comprises a shift register having 5 cells, a first pulse from the AND-gate 28 loading a logic "1" into the first cell and each consecutive pulse shifting said logic "1" one cell further, whereas each pulse from the detector 30 shifts said logic "1" one cell backwards. The output of the fifth cell of this shift register consequently supplies a logic "1" if and as long as all memories 21a to 21e are occupied by an information block I. The output of this cell is connected to two inverting inputs of the AND-gates 27 and 28.

The output of the AND-gate 27 is connected to an OR-gate 35 and to a monostable multivibrator 29, whose output is connected to an output terminal 37, which corresponds to the output 16a of the conversion arrangement 16 in FIG. 1. The output of the OR-gate 35 is connected to an input of the AND-gate 23 and a third input of the AND-gate 28. Finally, the arrangement comprises an EXOR-gate 34, whose two inputs are connected to the detector 24 and 25 respectively via two flip-flop circuits 38 and 39 respectively, and whose output is connected to an input of the OR-gate 35.

Figure 7:
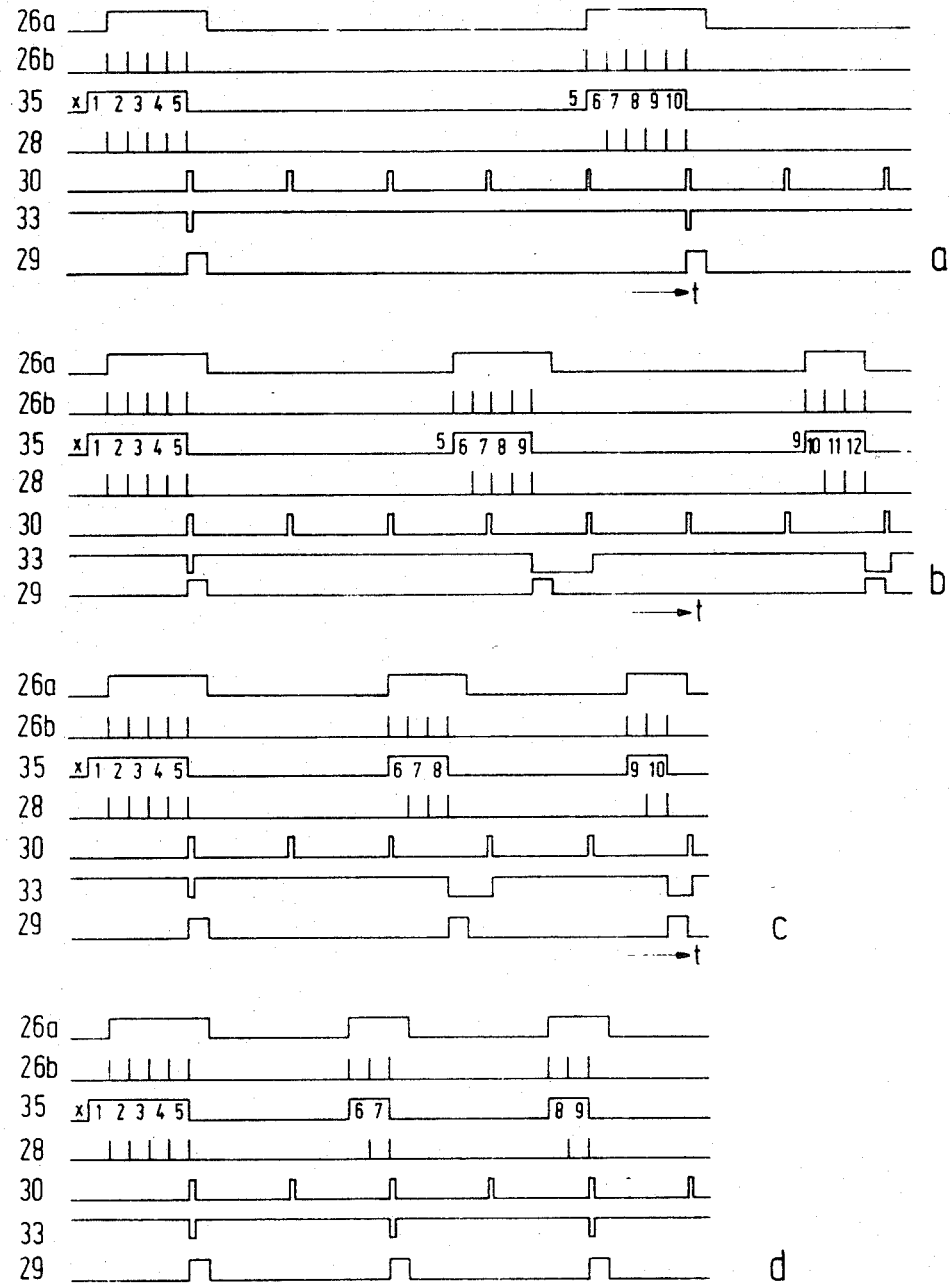

The operation of the arrangement shown in FIG. 5 will now be described with reference to the scanning diagrams shown in FIG. 5 and the corresponding signal waveforms shown in FIG. 7, which shows the various signals appearing in the arrangement of FIG. 5.

Figure 6:
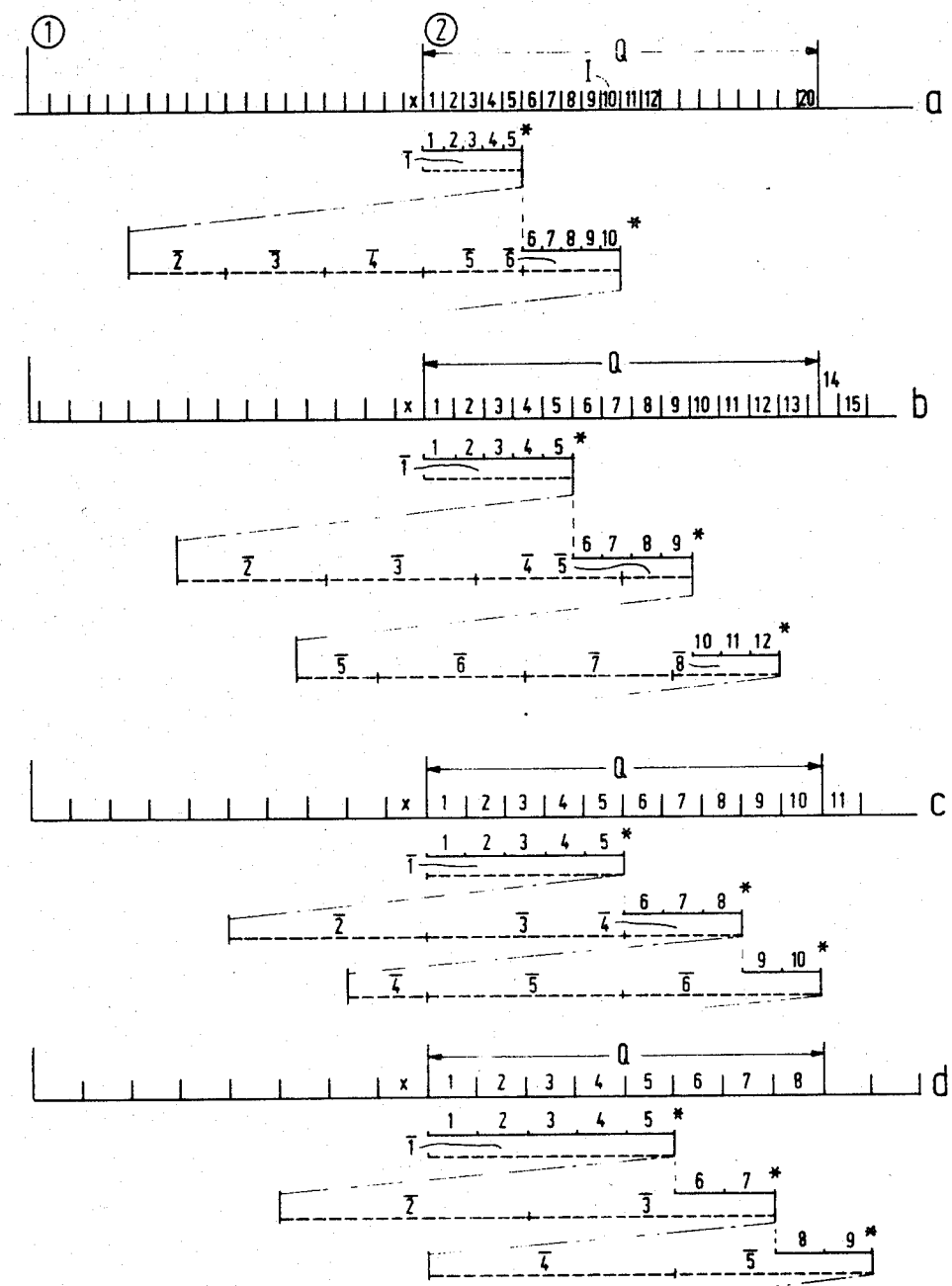
FIG. 6 shows the resulting scanning pattern of the record carrier, and FIG. 7 the corresponding control signals.

The required total storage capacity of the memory device 21 depends on the desired increase of the read-out speed of the record carrier and the size of the information blocks related to the largest turn of the track near the periphery of the record carrier (radius $R_O$). The scanning diagram of FIG. 6a represents the situation when scanning of one of the outer track turns. In the upper half the Figure shows a development of two track turns (1) and (2) of the spiral information track near the periphery of the information carrier. Near this periphery the number of information blocks per turn Q is greatest. In the present example it is assumed that near this periphery the number of information blocks I per track turn is 20. If the speed is selected to be a factor $n=5$ higher than is customary, which means that the digital information read should be expanded by a factor $n=5$, the memory device must have at least a capacity for the storage of the data bits recorded in $1/n - 1 = \frac{1}{4}$ part of this track turn. In the present example, which is compatible with the situation in the case of the record carriers of the Compact Disc Digital Audio System, the memory device should therefore be capable of storing at least $\frac{1}{4} \times 20 = 5$ information blocks I.

The manner in which the apparatus in accordance with the invention scans said outer track turn is represented in the lower half of FIG. 6a. It is assumed that when reading of the track (2) begins the memory device is still empty. This means that consecutively the information blocks 1, 2, 3, 4 and 5 can be read into this memory device. After these information blocks have been read in, the read spot is moved back radially by one track pitch, i.e. the read spot is positioned again on the preceding turn of the track, which track jump is indicated by the dashed-dot line in FIG. 6a. The read spot then again scans a part of the preceding track turn and then the information blocks 1 to 5 of the track turn (2). However, the information blocks read during this scan are no longer transferred to the memory device 21.

At the same time that the read-in of the first information block 1 begins the memory already starts to read out the data bits of this information block (designated $\bar{1}$ in FIG. 6a) at a rate which is reduced by the expansion factor 5. The read-out of this information block 1 from the memory device has therefore terminated at the instant that the information block 5 has just been read in. Immediately after this the read-out of information block 2 (designated $\bar{2}$) from the memory device is started, then the read-out of information block 3 etc. The Figure shows that the read-out (5) of the information block 5 has just terminated at the instant at which the scanning spot has reached the end of the information block 5, i.e. the beginning of the information block 6. The memory device is then empty again, so that the next 5 information blocks 6 to 10 can be read immediately into the memory device.

The read cycle described in the foregoing is effected automatically by the read apparatus shown in FIG. 5, which will be explained with reference to FIG. 7a. The numerals near the various signal waveforms in the left-hand margin refer to the various elements in the arrangement shown in FIG. 5.

For simplicity it is assumed that the information block 1 of the track turn (2) is preceded by an information block x and that the turn (1) contains no further information. If said information block x is read at the specific instant the detector 24 detects the identification code of this block. As the result of the appearance of an identification code on the output of the detector 24 after the information block has been read, the flip-flop 38 is triggered, which in response thereto supplies a logic "1" to the EXOR-gate 34. This EXOR-gate 34 then supplies a logic "1" to the AND-gate 23 via the OR-gate 35, which means that the next information block 1 is transferred to the switch $S_1$ via this AND-gate 23. When it is assumed that this switch $S_1$ is in the position shown, this information block 1 is consequently stored in the memory 21e.

At the end of this information block 1, the two detectors 24 and 25 have detected the identification code of this information block and supply this identification code to the comparator 26. Upon receipt of two identical identification codes, this comparator produces a pulse on its output 26b. Via the AND-gate 28, this pulse is transferred to the counter 33, so that its count is incremented by one. Moreover, this pulse advances the switch $S_1$ one step, i.e. for read-in of the memory 21d. On the output 26a of the comparator, a binary signal appears which assumes the logic value "1" as soon and as long as the identification codes supplied to the comparator are identical. This means that this output signal becomes "1" after read out of the information block 1 and remains "1" as long as the identification codes supplies by the detectors 24 and 25 are the same. The logic "1" level on this output 26a is transferred to the AND-gate 23 via the AND-gate 27 and the OR-gate 35, so that said gate 23 remains open to transfer the information blocks to the memory device 21. Since after the detection of the information block 1 a logic "1" is supplied to the second input of the EXOR-gate 34 via the detector 25 and the flip-flop 39, said EXOR-gate also receiving a logic "1" on its first input, the output of this gate becomes "0", so that this gate has no further function in the control of the read cycle. It is obvious that for starting the arrangement various other elements may be employed instead of the EXOR 24 and the flip-flops 38 and 39.

Each time after an information block has been read into a memory, a pulse on the output 26b of the comparator 26 the switch $S_1$ is set one position further and the count of the counter 33 is incremented by one via the AND-gate 28. At the instant that the information block 5 has been read into the memory 21a the counter 33 reaches the count 5, so that at this instant the two AND-gates 27 and 29 receive a logic "1" on their inverting inputs. As a result of this, the output of gate 27 and consequently that of the OR-gate 35 goes to zero, so that the AND-gate 23 no longer transfers any information blocks. Moreover, the falling edge of the output signal of AND-gate 27 causes the monostable multivibrator 29 to generate a pulse which is applied to an output terminal 37.

This output terminal 37 corresponds to the output 16a of the conversion arrangement 16 in FIG. 1. Therefore, this pulse is applied to the control circuit 12. In response to this pulse, this control circuit 12 interrupts the servo-loop of the radial positioning system for a short time and during this time it supplies a track-jump pulse to the drive means 13, so that the mirror 7 is subjected to an angular rotation such that the read spot is moved back by one track pitch. An example of the manner in which this can be achieved is described in U.S. Pat. No. Re. 29,963.

After this track-jump pulse, the scanning spot again scans a part of the preceding track, but the information blocks then read are not transferred to the memory device because the AND-gate 23 is blocked. At the instant that the information block 5 is read for the second time, the comparator 26 produces a logic "1" on its output 26a and a pulse on its output 26b. The last identification code which has been detected by the detector 25 during the preceding read cycle was the identification code of information block 5 and this identification code remains on its output until the next identification code is detected. At the instant that the information block 5 is read out for the second time, the identification codes supplied by the detectors 24 and 25 are consequently the same, which is detected by the comparator 26. In response thereto the output signal on output 26a of the comparator opens the AND-gate 23 via OR-gate 35, so that the information blocks 6 etc. can be written into the memory device. The pulse which appears on the output 26b after the appearance of the information block 5 is still blocked by the AND-gate 28, so that this AND-gate also receives an input signal from the output of the OR-gate 35 and this input signal does not become a logic "1" until after a slight delay produced by a built-in delay means (not shown). This means that the switch $S_1$ remains in the position shown until the information block 6 has been read in and also that the count of the counter 33 is not incremented by one until the information block 6 has been read into the memory 21e. When the read-in of the information block 6 begins said counter has reached position 0 because the five information blocks read-in during the preceding read cycle have all just been read out of the memory device at this instant. This means that now the information blocks 6 to 10 may be read into the memory device.

Thus, should each track turn comprise 20 information blocks, the read cycle shown in FIGS. 6a and 7a would be repeated continually. As already stated, however, this is not the case since the number of information blocks per turn decreases in proportion to the radius of the track turn, whilst at the same time the speed of the record carrier increases inversely proportionally to said radius in order to maintain the linear scanning speed constant. This means that the read cycle with which the information blocks are read into the memory device 21 varies as a function of the radius of the track turns.

By way of illustration the read cycles and the corresponding control signals are shown in FIGS. 6b to d and 7b to d, for three track turns of different radii. As can be seen in FIGS. 6b to c these turns comprise only 13, 10 and 8 information blocks respectively, i.e. the radii of these turns are 13/20, ½ and 2/5 of the radius of the outer track turn. For the sake of simplicity the starting condition is assumed to be same as for the outer track turn, so that the first read cycle is the same in all these cases. As can be seen in FIGS. 6b and 7b for example, only four information blocks I are read into the memory device during the second read cycle and only three during the third read cycle.

The number of information blocks that can be read into the memory device per read cycle decreases with the radius of a track turn. However, as the time interval between the read cycles also increases with the radius all information blocks can be read consecutively from the record carrier in expanded form in an uninterrupted pattern and applied to a decoding device 31 (FIG. 5), so that on an output terminal 32, the desired information signal becomes available.

Figure 8:
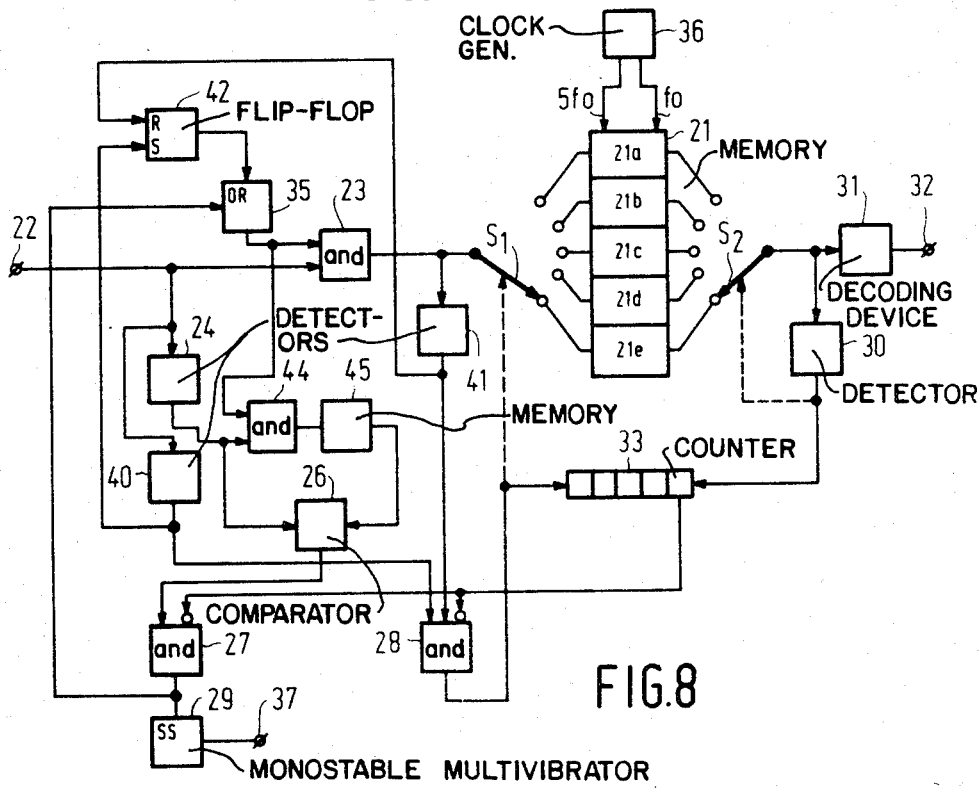
FIGS. 8, 9 and 10 finally show three further embodiments of the conversion arrangement.

It is obvious that as regards the circuit design of the arrangement shown in FIG. 5 many variants are possible. One of these variants is shown in FIG. 8, elements having the same function as in FIG. 5 bearing the same reference numerals.

The input terminal 22 is connected to the AND-gate 23 and to the detector 24 for detecting the identification code of the applied information blocks. Moreover, this input terminal 22 is connected to a detector 40, which detects the end of an information block I, for example by detection of the last synchronization word S (FIG. 4) of this information block. The output of the AND-gate 23 is also connected to such a detector 41. The detectors 40 and 41 may also be arranged to detect the first subcode symbol E & D of an information block I. The outputs of these detectors 40 and 41 are connected to the AND-gate 28 to supply control pulses to the switch $S_1$ and the counter 33. The output of the detector 24 is connected to an input of an AND-gate 44, whose second input is connected to the output of the OR-gate 35 and whose output is connected to a memory 45 for the storage of a detected identification code. The outputs of the detector 24 and the output of the memory 45 are connected to a comparator 26, which as soon and as long as the identification codes applied to its two inputs are identical supplies a logic "1" output signal to the AND-gate 27.

The operation of the arrangement is as follows. After a first information block has been read, the detector 40 supplies a pulse to the set input of the flip-flop 42, so that via the OR-gate 35 the AND-gate 23 is opened to transfer the information signal from the input 22 to the memory device 21. The end of the next information block results in a pulse on the output of the detector 41, so that the flip-flop 42 is reset and remains reset. The sole function of this flip-flop 42 is therefore to start the read-out cycle.

From the second information block onwards the identification code detected by the detector 24 is always supplied to the memory 45 via the AND-gate 44 which is then open. From this second information block the comparator 26 consequently always receives the same identification codes and therefore supplies a logic "1" to the AND-gate 27, as a result of which the AND-gate 23 remains open to transfer information blocks to the memory device 21.

After every read-out of an information block the two detectors 40 and 41 also supply a pulse to the AND-gate 28, so that the position of the switch $S_1$ is changed continually and the counter 33 is also incremented. If this counter 33 reaches the count 5 these two AND-gates 27 and 28 are blocked. The resulting output signal of the AND-gate 27 blocks the AND-gate 23 and also initiates the track jump of the read spot via the device 29. Since at this instant the AND-gate 44 is blocked, the identification code of the last information block I read into the memory device 21 remains stored in the memory 45. As soon as this information block is again applied to the input 23, the identification code of this block being detected by the detector 24, the comparator 26 again detects equality of the two applied identification codes and the next read-in cycle for the memory 21 is started.

As can be seen in FIG. 8 the remainder of the arrangement is the same as that of FIG. 5.

Figure 9:
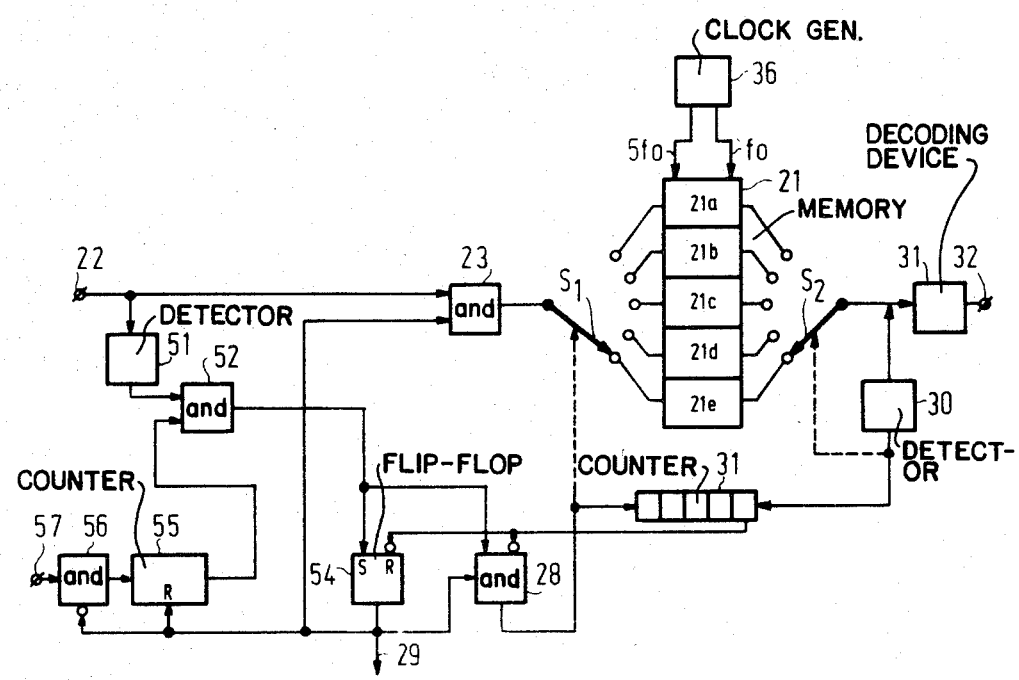

The two embodiments of the invention described so far are both based on the fact that each information block has an individual identification code, which is used for the organization of the read-in cycles for the memory device 21. It is alternatively possible to achieve this organisation without the use of said identification code. Instead, use can be made of a tacho-generator 20 which is coupled to the motor 2 (FIG. 1). An embodiment of the invention based on this principle is shown in FIG. 9, identical elements bearing the same reference numerals as in FIG. 5.

The input 22 is connected to a detector 51 which is arranged to detect the first subcode symbol C & D of an information block (FIG. 4). In the Compact Disc Digital Audio System this first subcode symbol of an information block I of 98 frames is defined unambiguously. Each time upon the appearance of said first subcode symbol, the output of this detector 51 supplies a pulse to an AND-gate 52. The output of this AND-gate is connected to the set input of a flip-flop 54 and an input of the AND-gate 28. The output of the flip-flop 54 is coupled to the AND-gate 23, for opening said AND-gate to transfer the information signal to the input 22 of the memory device 21 at the correct time intervals. Moreover, this output is coupled to the reset input of a counter 55 and to an inverting input of an AND-gate 56. A second input of this AND-gate 56 is connected to an input 57 which is coupled to the tacho-generator, whilst the output of this AND-gate 56 is connected to the count input of the counter 55.

The tacho-generator is constructed so that by means of this tacho-generator a radial position on the outermost turn of the information track can be determined with an accuracy greater than one information block I. In the aforementioned Compact Disc Digital Audio System the maximum number of information blocks in the outermost turn is in any case less than 20. This means that a tacho-generator which supplies 20 pulses per revolution of the record carrier is amply sufficient for the present use.

The counter 55 is adapted to supply a logic "1" output signal when the count 19 is reached. This means that, reckoned from the beginning of the read cycle, this counter supplies a logic "1" at the instant at which the record carrier has made nearly one revolution.

When the read-out of the record carrier is started, this counter is set to a count 19 so that its output signal is a logic "1". A first subcode symbol C & D detected by the detector 51 results in a pulse being applied to the set input of the flip-flop 54. In response thereto, this flip-flop 54 opens the AND-gate 23 to transfer the information signal to the memory device 21. The first pulse from the detector 51 is still blocked by the AND-gate 28 because the output signal of the flip-flop 54 is applied to this AND-gate 28 with a slight delay.

At the beginning of each following information block the detector 51 again supplies a pulse. These pulses control the position of the switch S₁ and the count of the counter 33. When this counter 33 reaches the count "5" the AND-gate 28 is blocked and the flip-flop 54 is reset. By the logic "0" then appearing on the output of the flip-flop 54, the AND-gate 23 is blocked. Moreover, the falling edge of this output signal resets the counter 55 to zero, so that its output signal becomes "0" and the AND-gate 52 is blocked. Finally, as a result of the appearance of the logic "0" of the flip-flop 54, the AND-gate 56, which was blocked until now, is opened via its inverting input. The tacho-pulses applied to the input 57 are transferred to the counter 55 via the AND-gate 56, which as soon as the count 19 is reached again, i.e. after nearly one revolution of the record carrier, supplies a logic "1" to the AND-gate 52. The first subcode symbol of an information block applied to the input 22 after this instant is then transferred to the flip-flop 54, so that it is set to "1" and the second read-in cycle of the memory device 21 is started.

Instead of a separate tacho-generator which is coupled to the record-carrier drive it is possible to employ the information signal actually read in order to derive a tacho-signal. For this purpose use may be made of the bit cells, the subcode symbols C & D, or the synchronisation words S. However, as the information density in the information track is constant, the number of bit cells, subcode symbols and synchronisation words per track turn varies depending on the radius of this turn of the information track. This means that a special measure is necessary to enable one of these signals to be used as a tacho-signal for the present purpose. This will be explained with reference to FIG. 10, where use is made of the detection of the first subcode symbol C & D of an information block in order to obtain the desired tacho-signal. For simplicity FIG. 10 only shows those elements which differ from the arrangement shown in FIG. 9.

Figure 10:
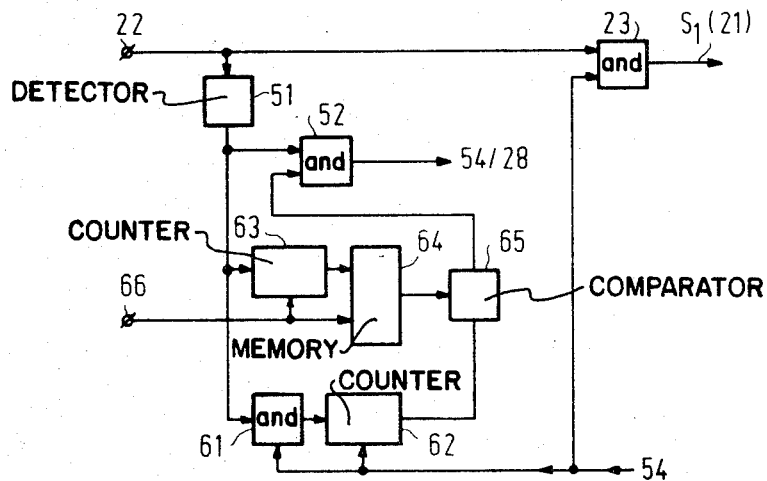

The arrangement shown in FIG. 10 comprises a counter 63 which is connected to the detector 51, which upon the appearance of the first subcode symbol of an information block on the input 22 supplies a pulse to this counter. Moreover, an input 66 of this counter 63 receives a tacho-pulse from a tacho-generator which is coupled to the motor 2 (FIG. 1) and which supplies one tacho-pulse per revolution of the record carrier. The output of the counter is connected to a memory 64. The tacho-pulse applied to the input 66 sets the counter to zero and also ensures that the instantaneous count of the counter 63 is stored in a memory 64 and remains stored therein until the next count is read in after one revolution of the record carrier. This means that at any instant, the memory 64 contains a count which corresponds to the number of information blocks on the turn of the information track being scanned instantaneously.

The pulses supplied by the detector 51 are also applied to an AND-gate 61, which in analogy to the AND-gate 56 in FIG. 9, is opened by the flip-flop 54 as soon as a read-in cycle of the memory device 21 has terminated. From this instant these pulses reach the counter 62. A comparator 65 detects the instant at which the count of this counter 62 becomes equal to the count stored in the memory 64 minus one, which corresponds to the instant at which the record carrier has made almost one revolution. At this instant the comparator 65 supplies a logic one to the AND-gate 52, so that pulses from the detector 51 are applied to the flip-flop 54 and the AND-gate 28, as a result of which the next read-in cycle of the memory device 21 is started.

Since in the present embodiment only the first subcode symbol of each information block is used for obtaining the desired tacho-signal, the accuracy of this embodiment is limited. However, this accuracy can simply be increased. For example, the pulses supplied by the detector 51 may be applied to a frequency multiplier. In addition to the pulses supplied by the detector 51, the pulses supplied by this frequency multiplier then also comprise pulses obtained by interpolation. By connecting the output of this frequency multiplier to the counter 63 a tacho-signal is obtained whose accuracy is increased by a factor equal to the frequency-multiplication factor.

Another possibility of increasing the accuracy of the tacho-signal is to employ another characteristic symbol in the information blocks. For example, each subcode symbol in an information block can be detected by means of a separate detector. Since each information block comprises 98 subcode symbols, the pulses supplied to the counter 63 by such a detector yield a tacho-signal which is a factor 98 more accurate than the tacho-signal obtained by means of the arrangement shown in FIG. 10.

Moreover, variants are possible with respect to the determination of a revolution period by means of the arrangement shown in FIG. 1. In the arrangement shown in FIG. 10 it is assumed that the tacho-generator supplies only one pulse per revolution to the terminal 66, which means that the measuring period for determining the number of subcode symbols is also one revolution period. However, by the use of a tacho-generator which supplies a plurality of pulses per revolution of the record carrier (for example 4) it is possible to determine the number of subcode symbols occurring between two consecutive tacho-generator pulses via the counter 63 and to derive the revolution period therefrom by means of a multiplier (4x) and store the corresponding count in the memory 64.

It will be evident that many variants are possible to the embodiments shown. In particular as regards the organization of the read cycle and the signals and logic elements used for this, it is evident that several possibilities are available. For example, in the arrangements shown in FIGS. 9 and 10, it is not necessary to utilize information blocks comprising 98 frames $F_3$, but it is also possible to use information blocks comprising an arbitrary number of frames $F_3$. The embodiments shown are all based on the signal format of the Compact Disc Digital Audio System. It will be evident that the scope of the invention is not limited to its use in this system.

Furthermore, it is to be noted that the time expansion used in the system in accordance with the invention should only be imposed on the information signal itself. The additional information present in the recorded information signal, such as the subcode symbols and synchronisation words, need not be expanded per se but may be keyed out in advance, i.e. prior to expansion. In this way it is possible to minimise the required storage capacity of the memory device. Therefore, in the description and the claims the term data bits is to be understood to mean only those information bits which are essential for a correct reproduction of a recorded information signal, i.e. those information bits which should necessarily be applied to the signal-processing device 31 in FIG. 5.

What is claimed is:

1. An apparatus for reading a disc-shaped record carrier with a multi-turn spiral information track provided with optically readable digitally coded information, said digital information being recorded in the information track as a stream of data bits of constant spatial bit frequency independently of the diameter of the track turn and comprising a sequence of detectable information blocks with a fixed number of data bits, said apparatus comprising a radiation source for emitting a read beam, an optical system for projecting said read beam as a read spot on the record carrier, a detection system for detecting the information contained in the read beam after cooperation with the record carrier, means for converting said information into an electric information signal, means for rotating the record carrier at a speed such that the read spot scans the information track at a scanning speed which is n times higher than the scanning speed which would result in said electric information signal having a desired bit frequency, a positioning system for controlling the radial position of the read spot on the record carrier, and a servo-system for controlling said scanning speed so that said electric information signal has a constant first bit frequency which is a factor n higher than the ultimately desired bit frequency independently of the radial position of the read spot on the record carrier, said converting means comprising a memory device for storing, with the first bit frequency, the data bits of an information block being read and for subsequently supplying said data bits with the desired bit frequency, to thereby reduce the susceptability of said apparatus to disturbances caused by shocks, vibrations and the like during read-out of the information, said apparatus further comprising a control unit which is coupled to the positioning system for effecting a jump-back of the scanning spot by one track pitch at instants which are determined by said control unit, said control unit also being coupled to the memory device for determining the periods during which said data bits are read into the memory device such that as a result of the scanning pattern of the information track and the read-in periods, consecutive information blocks are read into the memory device in accordance with a cycle which is determined by the control unit and are subsequently supplied by said memory device as a continuous sequence of information blocks.

2. An apparatus as claimed in claim 1, wherein the number of information blocks recorded in the outer turn of the information track is M, the factor n is at least greater than M/N+1, N being an integer, and the memory device has a capacity which is at least sufficient for storage of NP data-bits, P being the number of data bits of one information block.

3. An apparatus as claimed in claim 2, wherein for N greater than one, the memory device comprises N memories each having a capacity which is at least sufficient for storing P data bits, and the control unit is arranged to individually determine the read-in cycles of each of said memories.

4. An apparatus as claimed in claims 1, 2 or 3, wherein each of the information blocks recorded on the record carrier has an individual identification code, and wherein the control unit comprises an identification-code detector for detecting the identification code of an applied information block and the read-in cycle of the memory device and the scanning pattern on the record carrier are determined by said control unit in conformity with the detected identification codes.

5. An apparatus as claimed in claims 1, 2 or 3, wherein each of the information blocks recorded on the record carrier has a detectable beginning and/or end code, and wherein the control unit comprises a detector for detecting said beginning and/or end code, the apparatus further comprising a tacho-system for defining a revolution period of the record carrier at any scanning instant, and wherein the control unit determines the read-in cycle of the memory device in the scanning pattern of the record carrier in conformity with the detected beginning and/or end codes of the information blocks and the revolution period defined by the tacho system.

6. An apparatus as claimed in claim 5, wherein the tacho-system comprises a tacho-generator which is coupled to said means for rotating the record-carrier, which generator is is arranged to supply, during every revolution of the record carrier, a number of tacho-pulses which is at least equal to the number of information blocks or subblocks in the outer turn of the information track as unambiguously defined by a beginning and/or end code.

7. An apparatus as claimed in claim 5, wherein the tacho-system comprises a tacho-generator which is coupled to said means for rotating the record-carrier and which during every revolution of the record carrier supplies a limited number of tacho-pulses and the tacho-system further comprises a detector which is coupled to said converting means, for detecting an unambiguous symbol which occurs at least once per information block, and the tacho-system is arranged to determine the revolution period of the record carrier by means of the tacho pulses and the detected symbols at any scanning instant.

* * * * *